June 27, 1967

D. BLEICHER

SERIES TRANSISTOR VOLTAGE REGULATORS WITH FILTER CIRCUITS 3,328,674

Filed Dec. 3, 1963

2 Sheets-Sheet 1

INVENTOR
DAN BLEICHER
BY
Kirschstein, Kirschstein & Ottinger
ATTORNEYS

INVENTOR
DAN BLEICHER
BY
ATTORNEYS

United States Patent Office 3,328,674

Patented June 27, 1967

3,328,674
SERIES TRANSISTOR VOLTAGE REGULATORS WITH FILTER CIRCUITS

Dan Bleicher, Coventry, England, assignor to The General Electric Company, Limited, London, England Filed Dec. 3, 1963, Ser. No. 327,714
Claims priority, application Great Britain, Dec. 4, 1962, 45,815/62
6 Claims. (Cl. 323—22)

This invention relates to electric filter circuits. More particularly, but not exclusively, this invention relates to electric filter circuits forming part of electric power supply arrangements.

A previously proposed form of power supply arrangement operates to maintain the potential of a supply line at a desired potential relative to earth by providing a switch, which may be the collector-emitter path of a junction transistor, between an unstabilised direct current source and the supply line, and by causing the transistor to be conducting or non-conducting in dependence upon the actual potential of the supply line. The arrangement includes a feedback network which operates to sense the actual potential of the supply line and to supply to the base electrode of the transistor a pulse signal, each pulse of which causes the transistor to conduct for the duration of the pulse. Variations in the voltage of the source or in the current drawn from the supply line cause the feedback network to operate to vary the "mark/space" ratio of the pulse signal, and hence the proportion of the time for which the transistor is conducting, such that the supply line is maintained at substantially the desired potential.

Such an arrangement necessarily includes a filter circuit connected between the transistor and the supply line to effect smoothing. However, some difficulties arise in providing such a filter circuit. Thus if the filter circuit has a capacitative input, there is a tendency for a comparatively large current to flow through the transistor when it first becomes conducting, and this may result in damage to the transistor. On the other hand, if the filter circuit has an inductive input, there is some difficulty in causing the transistor to become non-conducting quickly, as the inductance tends to cause the current to continue flowing in the transistor.

Theoretically, a power supply arrangement of the kind outlined above can have a high efficiency. That is to say, the ratio of output power supplied from the supply line to a load, to input power drawn from the source, can be large. This results in a further difficulty in providing the filter circuit, as it is desirable that the filter circuit should not be such as to reduce the efficiency unduly.

One object of the present invention is to provide a filter circuit which may, for example, be used in a power supply arrangement of the kind outlined above, and when so used is such as to overcome, at least in part, the difficulties mentioned above.

According to the present invention, an electric filter circuit comprises first and second input terminals, first and second output terminals, a first path connecting the first input terminal to the first output terminal, said first path including the primary winding of a transformer, a second path connecting the second input terminal to the first output terminal, said second path including a secondary winding of said transformer and a rectifier element connected in series, and a third path connecting the second input terminal to the second output terminal, the arrangement being such that when an increasing current is flowing in said primary winding a voltage is induced in said secondary winding, which voltage is such as to bias said rectifier element in the reverse direction, but when a decreasing current is flowing in said primary winding the voltage induced in said secondary winding is such as to bias said rectifier element in the forward direction, and current flows by way of said secondary winding and said rectifier element to the first output terminal.

Three filter circuit arrangements in accordance with the present invention, together with a power supply arrangement of which any one of the filter circuit arrangements may form part, will now be described by way of example with reference to the accompanying drawings in which.

The same reference numerals are used for corresponding items, where possible, throughout the drawings.

Figure 1:
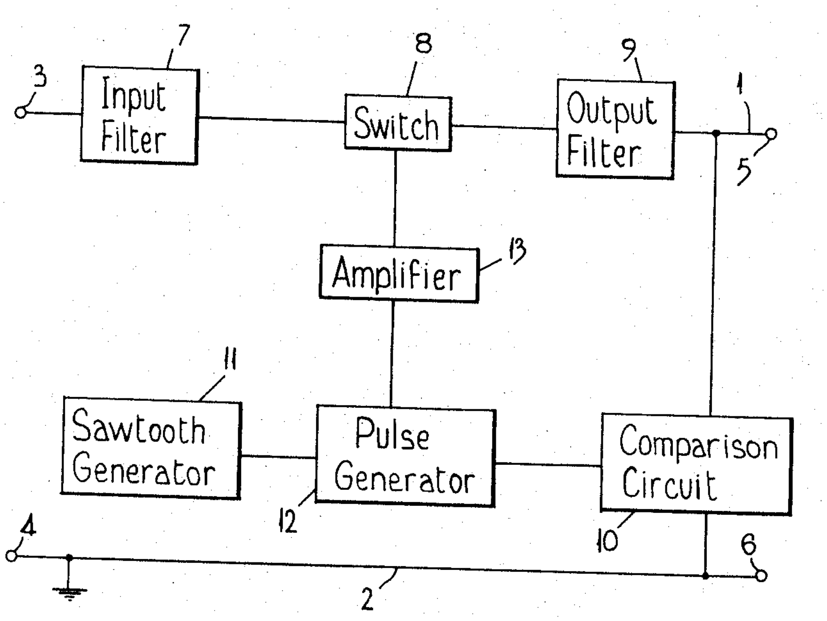
FIGURE 1 is a block schematic diagram of the power supply arrangement.

Referring now to FIGURE 1, the arrangement operates to maintain a supply line 1 at a stable potential relative to an earth line 2. Unstabilised power is supplied to the arrangement by way of input terminals 3 and 4, and the output from the arrangement is supplied to a load (not shown) which is connected between the output terminals 5 and 6. The input terminal 3 is connected to the output terminal 5 by way of an input filter 7, a switch 8, and an output filter 9. A comparison circuit 10 is connected between the supply line 1 and the earth line 2 and operates to sense the actual potential of the supply line 1 and to compare this potential with a stable reference potenial. This comparison results in the production of an error signal which is supplied, together with a signal from a saw-tooth generator 11, to a pulse generator 12. The pulse generator 12 compares the amplitudes of the error signal from the comparison circuit 10 and the signal from the saw-tooth generator 11 and operates to supply a pulse signal, the pulse repetition frequency of which is the same as the frequency of the saw-tooth generator 11. Each pulse of this pulse signal starts in coincidence with the beginning of a cycle of the saw-tooth generator 11, and ends in coincidence with the instant at which the amplitudes of the error signal produced by the comparison circuit 10 and of the signal produced by the saw-tooth generator 11 are equal. The pulse signal supplied by the pulse generator 12 is supplied to the switch 8 by way of an amplifier 13.

The arrangement operates such that variations in the voltage of the power supplied to the arrangement, or in the current drawn from the supply line 1, tend to cause a change in the potential of the supply line 1, and hence a change in the amplitude of the error signal supplied by the comparison circuit 10. This in turn varies the "mark/space" ratio of the pulse signal supplied by the pulse generator 12, and this varies the proportion of the total time for which the switch 8 is conducting. This variation in such as to effect the desired stabilisation of the potential of the supply line 1.

The switch 8 is a junction transistor, the collector-emitter path of which is controlled to be conducting or non-conducting in dependence upon the pulses supplied to its base electrode from the pulse generator 12. The transistor 8 is used only as a switch, that is, when a pulse is supplied to its base electrode it is caused to conduct, but when no pulse is supplied it is non-conducting, no use being made of intermediate conditions in which the transistor 8 is partially conducting. In practice, more than one transistor may be used for the switch 8 so as to obtain the required power handling capacity.

The input filter 7 operates such that the current drawn from the input terminal 3 is maintained substantially constant.

The arrangement may also include some provision for protecting it against fault conditions which might result in damage to the arrangement.

Figure 2:
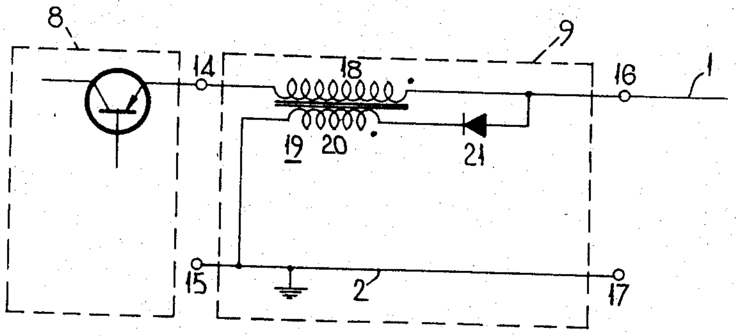
FIGURE 2 is a circuit diagram of the switch and output filter circuit of the arrangement of FIGURE 1.

Referring now to FIGURE 2, the filter circuit is a four terminal network having two input terminals 14 and 15, and two output terminals 16 and 17. The emitter electrode of the transistor switch 8 is connected to the input terminal 14, and the output from the circuit is supplied to the supply line 1 which is conneced to the output terminal 16. The input terminal 15, and the output terminal 17 are both connected to the earth line 2. The primary winding 18 of a transformer 19 is connected between the input terminal 14 and the output terminal 16. One end of the secondary winding 20 of the transformer 19 is connected to the earth line 2, whilst the other end is connected by way of a rectifier element 21 to the end of the primary winding 18 remote from the input terminal 14.

The operation of the filter circuit is as follows. During each interval when the transistor switch 8 is conducting, the current flowing in the primary winding 18 is increasing. A voltage is therefore induced in the secondary winding 20, this voltage being such as to bias the rectifier element 21 in the reverse direction so that there is no current flow through the secondary winding 20, and current is supplied to the output terminal 16 by way of the primary winding 18.

During each interval when the transistor switch 8 is non-conducting, the current flowing in the primary winding 18 is decreasing. A voltage is therefore induced in the secondary winding 20, which voltage is such as to bias the rectifier element 21 in the forward direction.

Thus, during the intervals when the transistor switch 8 is non-conducting, the rectifier element 21 is forward biased and current is supplied to the output terminal 16 by way of the rectifier element 21 and the secondary winding 20. This means that immediately after a pulse has been supplied to the base electrode of the transistor switch 8 tending to render it non-conducting, a large part of the current supplied to the output terminal 16 is not being drawn from the primary winding 18, and thus the efficiency of the arrangement is high.

Immediately after the transistor switch 8 has received a pulse tending to render it non-conducting, and the rectifier element 21 has become forward biased, a reactive voltage is set up across the secondary winding 20. This reactive voltage induces a voltage across the primary winding 18, which voltage is such as to make the potential of the input terminal 14, and hence the emitter electrode of the transistor switch 8, of such a value that the transistor switch 8 is caused to become non-conducting rapidly.

Figure 3:
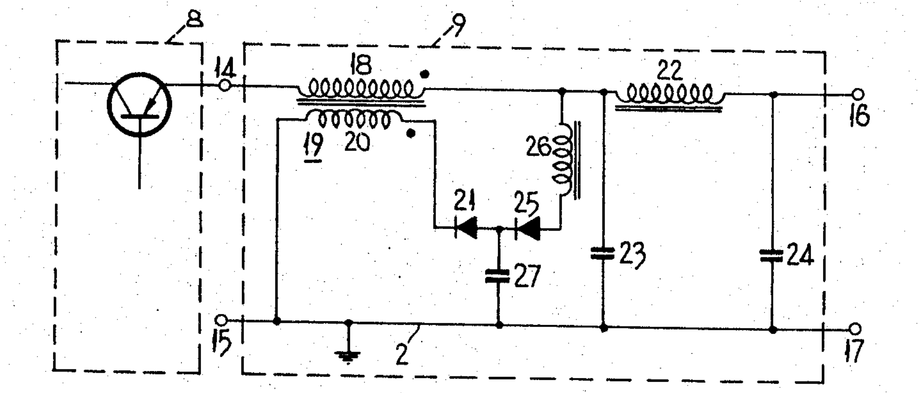
FIGURE 3 is a circuit diagram of a modified form of the circuit shown in FIGURE 2.

Referring now to FIGURE 3, the arrangement shown here incorporates the arrangement shown in FIGURE 2 with the following additions. An inductor 22 is connected between the primary winding 18 and the output terminal 16. The ends of the inductor 22 are connected to the earth line 2 by way of capacitors 23 and 24. A further rectifier element 25 and a further inductor 26 are connected in series with the secondary winding 20 and the rectifier element 21 between the earth line 2 and the end of the primary winding 18 remote from the input terminal 14. The junction between the rectifier elements 21 and 25 is connected to the earth line 2 by way of a capacitor 27.

The operation of this modified arrangement is substantially the same as that described above with reference to FIGURE 2, but with the improvement that the capacitor 27 tends to match the voltage induced in the secondary winding 20 to the potential of the supply line 1, thus giving greater efficiency. The inductor 22 and the capacitors 23 and 24 operate to further smooth the output before it is supplied to the output terminal 16.

Figure 4:
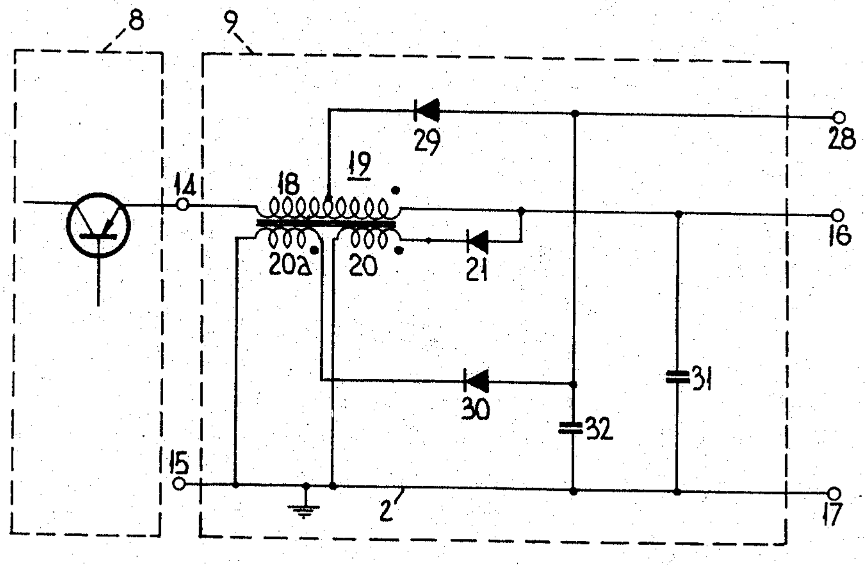
FIGURE 4 is a circuit diagram of another modified form of the circuit shown in FIGURE 2.

Referring now to FIGURE 4, this arrangement provides two outputs, one between the output terminals 16 and 17 and the other between a further output terminal 28 and the output terminals 17. A tapping is taken from the primary winding 18 and is connected to the output terminal 28 by way of a rectifier element 29. A further secondary winding 20a is provided, one end being connected to the earth line 2 and the other end being connected by way of a rectifier element 30 to the output terminal 28. A capacitor 31 is connected between the output terminals 16 and 17, and another capacitor 32 is connected between the output terminals 28 and 17.

The operation of this arrangement is substantially the same as that previously described with reference to FIGURE 2, but supplies two outputs, the value of one of which depends upon the ratio of the secondary winding 20 to the primary winding 18, and the value of the other of which depends upon the position of the tapping on the primary winding 18 and on the ratio of the secondary winding 20a to the primary winding 18.

It will be appreciated that by providing the necessary number of tappings on the primary winding 18 and the necessary number of secondary windings of the required number of turns, any number of outputs of desired values can be provided.

The operation of this modified arrangement is substantially the same as that of the arrangement previously described with reference to FIGURE 3, but with the advantage that not all of the power supplied to the output terminal 16 passes by way of the transistor switch 8. Although the transistor switch now has a choke in its emitter circuit, it will still be possible to switch it off rapidly. During the switch off time, current from the inductor 22 will continue to flow by way of the inductor 26, the rectifier elements 25 and 21, and the secondary winding 20, and this will ensure that the emitter electrode of the transistor switch 8 is at such a potential that the transistor switch 8 will rapidly switch off.

I claim:

1. An electric filter circuit comprising first and second input terminals, first and second output terminals, a transformer, the primary winding of which is connected in a first path between the first input terminal and the first output terminal, a path between the second input terminal and the first output terminal and comprising, in series, a secondary winding of said transformer, first and second rectifier elements and an inductive element, a third path between said second input terminal and said second output terminal and a capacitive element connected between the junction of said rectifier elements and said third path, the rectifier elements being similarly directed and connected so that when an increasing current is flowing in said primary winding the voltage induced in said secondary winding biases said rectifier elements in the reverse direction, but when a decreasing current is flowing in said primary winding the voltage induced in said secondary winding biases said rectifier elements in the forward direction current then flowing between said second input terminal and said first output terminal by way of said secondary winding.

2. An electric filter circuit comprising first and second input terminals, first, second and third output terminals, a transformer, the primary winding of which is connected in a first path between the first input terminal and the first output terminal, a second path connecting the second input terminal to the first output terminal and comprising a first rectifier element connected in series with a secondary winding of said transformer, a third path connecting the second input terminal to the third output terminal and comprising a second rectifier element connected in series with a further secondary winding of said transformer, the third output terminal being connected also to a tapping on said primary winding by way of a third rectifier element, and a fourth path connecting the second input terminal to the second output terminal, said first, second and third rectifier elements being so connected that when an increasing current is flowing in said primary winding, a voltage is induced in each of the two said secondary windings which voltages are such as to bias said first and second rectifier elements in the reverse direction, said third rectifier element being then biased in the forward direction, and when a decreasing current is flowing in said primary winding a voltage is induced in each of said secondary windings which voltages are such as to bias said first and second rectifier elements in the forward direction, said third rectifier element then being biased in the reverse direction and current flowing by way of said two secondary windings between said second input terminal and said first and third output terminals.

3. An electric filter circuit according to claim 2 wherein said first and third output terminals are connected to said fourth path by way of respective capacitive elements.

4. An electric power supply arrangement comprising a voltage stabilising means and in combination therewith an electric filter circuit to filter the output of said stabilising means, said filter circuit comprising first and second input terminals, said first input terminal being connected to the output of the voltage stabilising means, first, second and third output terminals, a transformer, the primary winding of which is connected in a first path between the first input terminal and the first output terminal, a second path connecting the second input terminal to the first output terminal and comprising a first rectifier element connected in series with a secondary winding of said transformer, a third path connecting the second input terminal to the third output terminal and comprising a second rectifier element connected in series with a further secondary winding of said transformer, the third output terminal being connected also to a tapping on said primary winding by way of a third rectifier element, and a fourth path connecting the second input terminal to the second output terminal, said first, second and third rectifier elements being so connected that when an increasing current is flowing in said primary winding, a voltage is induced in each of the two said secondary windings which voltages are such as to bias said first and second rectifier elements in the reverse direction, said third rectifier element being then biased in the forward direction, and when a decreasing current is flowing in said primary winding a voltage is induced in each of said secondary windings which voltages are such as to bias said first and second rectifier elements in the forward direction, said third rectifier element then being biased in the reverse direction and current flowing by way of said two secondary windings between said second input terminal and said first and third output terminals.

5. An electrical power supply arrangement comprising a voltage stabilising means having a junction transistor as its regulating element and in combination with said voltage stabilising means an electrical filter circuit to filter the output of said stabilising means, said electrical filter circuit comprising first and second input terminals, said first input terminal being connected to the output of the voltage stabilising means, first and second output terminals, a transformer, the primary winding of which is connected in a first path between the first input terminal and the first output terminal, a rectifier element which is connected in series with a secondary winding of said transformer in a second path between the second input terminal and the first output terminal and a third path connecting the second input terminal to the second output terminal, said rectifier element being so connected that when an increasing current is flowing in said primary winding the voltage induced in said secondary winding biases said rectifier element in the reverse direction, but when a decreasing current is flowing in said primary winding the voltage induced in said secondary winding biases said rectifier element in the forward direction and current flows by way of said secondary winding and said rectifier element to said first output terminal.

6. An electric power supply arrangement according to claim 4 wherein said voltage stabilising means is a series stabiliser having a junction transistor as its regulating element.

References Cited

UNITED STATES PATENTS

| | | | |
|---|---|---|---|
| 2,820,941 | 1/1958 | Berkery | 321—18 |
| 3,090,017 | 5/1963 | Novic | 333—79 |
| 3,115,600 | 12/1963 | Brolin | 323—22 |
| 3,174,094 | 3/1965 | Farnsworth et al. | 323—18 |
| 3,223,915 | 12/1965 | Ryerson et al. | 321—18 |

FOREIGN PATENTS

| | | |
|---|---|---|
| 872,776 | 7/1961 | Great Britain. |

JOHN F. COUCH, *Primary Examiner.*

W. E. RAY, M. L. WACHTELL, *Assistant Examiners.*